US008087239B2

(12) United States Patent
Bugos et al.

(10) Patent No.: US 8,087,239 B2
(45) Date of Patent: Jan. 3, 2012

(54) FLUID SUPPLY CONNECTION FOR REDUCTANT DELIVERY UNIT FOR SELECTIVE CATALYTIC REDUCTION SYSTEMS

(75) Inventors: Stephen Bugos, Poquoson, VA (US); Willem Nicolaas van Vuuren, Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 671 days.

(21) Appl. No.: 12/153,353

(22) Filed: May 16, 2008

(65) Prior Publication Data
US 2009/0107126 A1 Apr. 30, 2009

Related U.S. Application Data

(60) Provisional application No. 60/982,531, filed on Oct. 25, 2007.

(51) Int. Cl.
*F01N 3/00* (2006.01)

(52) U.S. Cl. ............ 60/298; 60/286; 60/274; 60/295; 60/320; 60/740; 123/470; 123/540; 239/128; 239/139

(58) Field of Classification Search ............ 60/273, 60/274, 284–287, 295–301, 740; 123/470, 123/540; 239/128–139
See application file for complete search history.

(56) References Cited

U.S. PATENT DOCUMENTS

| 4,597,850 | A | * | 7/1986 | Takahasi et al. ............. 204/426 |
|---|---|---|---|---|
| 4,742,964 | A | * | 5/1988 | Ito et al. ..................... 239/397.5 |
| 4,895,495 | A | * | 1/1990 | Arai ............................. 417/360 |
| 5,224,343 | A | * | 7/1993 | Steenborg et al. ............. 60/240 |
| 6,041,594 | A | * | 3/2000 | Brenner et al. ................ 60/309 |
| 6,319,376 | B1 | * | 11/2001 | Graser et al. .................. 204/424 |
| 6,412,450 | B1 | * | 7/2002 | Jaasma ...................... 123/41.31 |
| 6,481,420 | B1 | * | 11/2002 | Panasuk et al. .............. 123/470 |
| 6,526,746 | B1 | * | 3/2003 | Wu ................................. 60/286 |
| 6,685,112 | B1 | | 2/2004 | Hornby et al. |
| 6,814,303 | B2 | * | 11/2004 | Edgar et al. .................. 239/128 |
| 6,996,976 | B2 | * | 2/2006 | Rumminger et al. .......... 60/295 |

(Continued)

FOREIGN PATENT DOCUMENTS

DE     10241698 A1     5/2003

(Continued)

OTHER PUBLICATIONS

U.S. Appl. No. 12/078,252, filed Mar. 28, 2008, van Vuuren.

*Primary Examiner* — Thomas Denion
*Assistant Examiner* — Jesse Bogue

(57) ABSTRACT

A reductant delivery unit (16) is provided unit for selective catalytic reduction (SCR) after-treatment for vehicles. The unit includes a solenoid fluid injector (18) associated with an exhaust gas flow path (13). The injector has a fluid inlet (28) and a fluid outlet (30) with the fluid inlet receiving a source of urea solution and the fluid outlet communicating directly with the exhaust flow path so as to control injection of urea solution into the exhaust gas flow path. Supply structure (32) defines the fluid inlet and includes a cup (37) coupled to a body (18) of the injector and a supply tube (29) integral with the cup to define a single member. The supply tube is coupled with the source (27) of urea solution to deliver urea solution to the fluid inlet. The supply tube is heated by a heat source (33) so that an entire volume of the urea solution delivered to the fluid inlet is heated.

17 Claims, 1 Drawing Sheet

U.S. PATENT DOCUMENTS

| | | | |
|---|---|---|---|
| 6,997,401 B2 * | 2/2006 | Baasch et al. | 239/533.2 |
| 7,337,607 B2 * | 3/2008 | Hou et al. | 60/274 |
| 7,603,849 B2 * | 10/2009 | Hanitzsch et al. | 60/286 |
| 7,614,213 B2 * | 11/2009 | Hirata et al. | 60/286 |
| 2006/0101810 A1 * | 5/2006 | Angelo et al. | 60/286 |
| 2008/0134671 A1 * | 6/2008 | Nefischer | 60/300 |

FOREIGN PATENT DOCUMENTS

| | | |
|---|---|---|
| EP | 1662108 A | 5/2006 |
| FR | 2874075 A | 2/2006 |
| FR | 2897644 A | 8/2007 |
| WO | WO 03/039718 A | 5/2003 |
| WO | WO 2006/050547 A | 5/2006 |

* cited by examiner

FLUID SUPPLY CONNECTION FOR REDUCTANT DELIVERY UNIT FOR SELECTIVE CATALYTIC REDUCTION SYSTEMS

This application claims the benefit for priority purposes of the earlier filing date of U.S. Provisional Application No. 60/982,531, filed on Oct. 25, 2007, which is hereby incorporated by reference into this specification.

FIELD OF THE INVENTION

The invention relates to a reductant delivery unit (RDU) that supplies reductant to an engine exhaust system and, more particularly, to an improved fluid supply connection between a Selective Catalytic Reduction (SCR) injection unit and heated supply tube.

BACKGROUND OF THE INVENTION

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution (CO $(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

The delivery of the AUS-32 solution to the exhaust involves precise metering of the fluid and proper preparation of the fluid to facilitate the later mixing of the ammonia in the exhaust stream. The precise metering is typically provided by the use of a low-cost, high volume solenoid injector commonly used in gasoline fuel systems.

The injector is supplied with AUS-32 via tubing that must be heated due to the relatively high freezing point of −11 C of the fluid. With reference to FIG. 1, the tubing interface 10 to the RDU 12 is generally a fluid connection that permits rapid coupling or decoupling of heated tubing (not shown) from the interface 10 for ease of assembly or for servicing. The RDU 12 is shown coupled to an exhaust flow path 13. The injector side of the connection is then welded or joined to the injector cup 14, into which is placed the injector inlet connector with O-ring 15 providing sealing. This connection results in an unheated volume (indicated by dimension A in FIG. 2) of fluid that is difficult to reach by the electrical heating element emanating from the tubing, thus increasing thaw times to thaw this volume.

Robert Bosch and Purem each have SCR systems in limited volume production for the heavy-duty diesel engine sector.

In the case of the Purem system, the metering control is carried out by a Siemens Deka IV injector mounted in a control block. The metered fluid is transported via a tube to the exhaust. After the metering valve, the fluid is also exposed to compressed air to aid with atomization which will ensure subsequent good mixing with the exhaust gas. The pressurized mixture is then injected into the exhaust. There is no provision for heating the fluid in the dosing unit. However, tubes supplying the dosing unit are heated and the system is purged with air at shutdown minimizing the amount of fluid that freezes. The fluid connection is made with a standard SAE J2044 quick connect fitting, creating the thawing problem noted above.

The Bosch production air-assist system also comprises a dosing module with heated supply tubes. Bosch has also disclosed a system concept that does not use air. Since air compression is not expected to be available on many future applications of the SCR technology, there is a need to have delivery of the AUS-32 without air-assistance while using a solenoid injector. In the conventional Bosch system without air assistance, the supply tubes to the injection unit are heated, with the injection unit interface to the fluid supply tubes employing the SAE J2044 quick connect fittings, creating the thawing problem noted above.

Thus, there is also a need to provide an improved fluid connection for an RDU that minimizes the volume of unheated fluid at the supply system interface.

SUMMARY OF THE INVENTION

An object of the invention is to fulfill the needs referred to above. In accordance with the principles of the present invention, this objective is obtained by providing a reductant delivery unit for selective catalytic reduction (SCR) after-treatment for vehicles. The reductant delivery unit includes a solenoid fluid injector constructed and arranged to be associated with an exhaust gas flow path upstream of a SCR catalytic converter. The fluid injector has a fluid inlet and a fluid outlet. The fluid inlet being constructed and arranged to receive a source of urea solution and the fluid outlet being constructed and arranged to communicate directly with the exhaust flow path so as to control injection of urea solution into the exhaust gas flow path. Supply structure defines the fluid inlet. The supply structure includes a cup coupled to a body of the injector and a supply tube integral with the cup to define a single member. The supply tube is constructed and arranged to be coupled with the source of urea solution to deliver urea solution to the fluid inlet. The supply tube is constructed and arranged to be heated by a heat source so that an entire volume of the urea solution delivered to the fluid inlet is heated.

In accordance with yet another aspect of a disclosed embodiment, a method ensures that urea solution provided to a reductant delivery unit (RDU) for selective catalytic reduction (SCR) after-treatment for vehicles is heated. The RDU is mounted with respect to an exhaust gas flow path so as to inject urea solution directly into the exhaust gas flow path. The method provides supply structure defining a fluid inlet of the RDU. The supply structure includes a supply tube integral with a portion of the RDU so as to define a single member. The supply tube is coupled with the source of urea solution to deliver urea solution to the fluid inlet. The supply tube is heated so that an entire volume of the urea solution delivered to the fluid inlet of the RDU is heated.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 3:
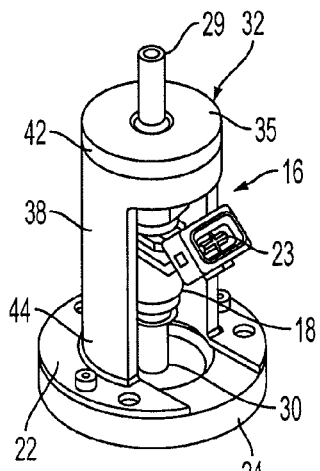
FIG. 3 is a perspective view of an RDU, provided in accordance with an embodiment of the present invention, having supply structure including a heated supply tube integrated into an injector cup.

With reference to FIG. 3, a reductant delivery unit (RDU) for the delivery of AUS-32 to the engine exhaust is shown, generally indicated at 16, in accordance with an embodiment of the invention. The RDU 16 is used in SCR exhaust aftertreatment systems on vehicles.

Figure 5:
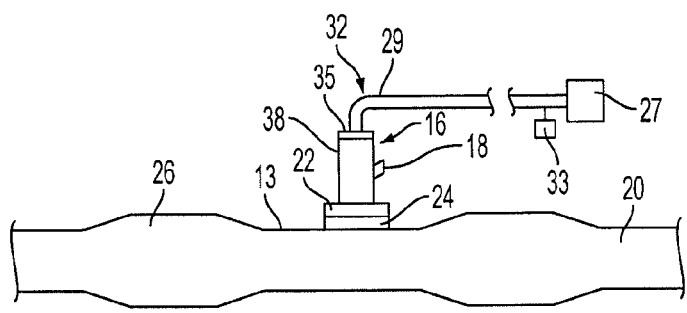
FIG. 5 is schematic view of the RDU of FIG. 2 shown mounted to an exhaust flow path.

The metering function of the RDU 16 is performed by a specially adapted and packaged solenoid fluid injector 18. The injector 18 also provides the spray preparation of the fluid in the exhaust path 13 that is upstream of an SCR catalytic converter 20 (FIG. 5). More particularly, a flange 22 of the RDU 16 with injector 18 is mounted on a boss 24 of the exhaust path 13 preferably between an oxygen catalytic converter 26 and the SCR catalytic converter 20. An advantage of using the fluid injector 18 is a reduction in cost afforded by using a high volume automotive component.

The fluid injector 18 is preferably a gasoline, electrically operated, solenoid fluid injector such as the type disclosed in U.S. Pat. No. 6,685,112 and co-pending U.S. application Ser. No. 12/078,252, filed on Mar. 28, 2008, the content of this patent and this application are hereby incorporated by reference into this specification.

The injector 18 also has a fluid inlet 28 and a fuel outlet 30 that extends through the flange 24. The inlet 28 receives a source of urea solution or AUS-32 via a supply tube 29 from a tank 27 (FIG. 5). The fluid outlet 30 communicates with the exhaust flow path 13 so the solution can be injected directly into the exhaust flow path 13. Power is provided to the injector 18 at electrical connector 23. The injector 18 controls the flow rate of AUS-32 into the exhaust flow path 13 and also shuts-off the flow.

Figure 1:
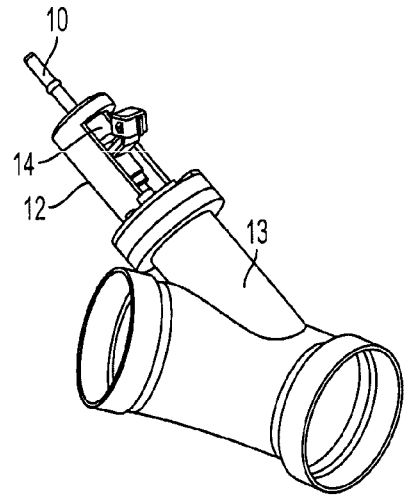
FIG. 1 is a view of a conventional RDU, connected to an exhaust flow path, showing a fluid supply connection thereof.
Figure 2:
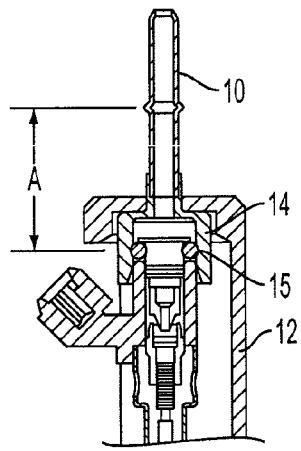
FIG. 2 is a sectional view of a portion of the RDU of FIG. 1.
Figure 4:
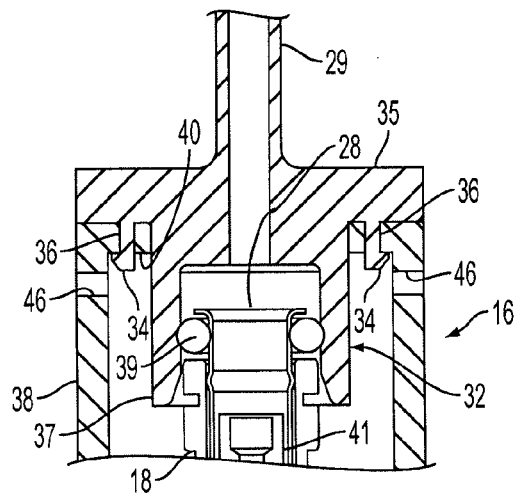
FIG. 4 is a sectional view of a portion of the RDU of FIG. 3.

In accordance with an embodiment of the invention and as best shown in FIG. 4, the supply tube 29 is made integral with a supply structure, generally indicated at 32, of the injector 18. The supply structure 32 communicates with the fluid inlet 28 of the injector 18. Thus, with the embodiment, there is no connection between the supply tube 29 and the supply structure 32 since they are integral and define a single member. As shown in FIG. 5, a heat source 33 heats the entire supply tube 29 so that an entire volume of the urea solution delivered to the inlet 28 of the injector 18 is heated. Therefore, this configuration provides an advantage over the conventional RDU 12 of FIG. 2 since no time is needed to thaw fluid that would otherwise freeze in the unheated volume A of FIG. 2.

The supply structure 32, preferably molded of plastic, includes an integral flange 35, from which the integral supply tube 29 extends, and an integral cup 37 that is sealed with respect to the injector body 41 via an O-ring 39. The flange 35 can be considered to be part of the cup 37. The supply structure 32 is mechanically joined to the RDU 16. In the embodiment, this mechanical coupling is achieved by providing multiple flexible tangs 34 extending from the flange 35. The tangs 34 are defined during molding of the supply structure 32. Each tang 34 passes through opening 36 in a heat shield 38 of the RDU 16 and engages a surface 40 of the heat shield 38 at a first end 42 thereof. The heat shield 38 is generally cylindrical having an open end 42. The flange 35 closes the open end 42. The heat shield is constructed and arranged to substantially surround the injector 18 with the other, opposing end 44 of the heat shield 38 being coupled with the flange 22 that mounts to the boss 24.

In the event that servicing is required without disassembly of the RDU 16 from the exhaust gas path 13, access openings to access the tangs 34 are provided in the heat shield 38 for a tool to push the tangs 34 back toward the openings 36. Instead of providing the tangs, other removable securing means can be used such as, for example, bolts, clips, snap fits, etc.

In the event that servicing is not desirable, another embodiment would involve the molding of the plastic supply structure 32 directly to the heat shield 38. The heat shield 38 would subsequently be assembled to the rest of the RDU 16.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for selective catalytic reduction (SCR) after-treatment for vehicles, the reductant delivery unit comprising:
   a solenoid fluid injector constructed and arranged to be associated with an exhaust gas flow path upstream of a SCR catalytic converter, the fluid injector having a fluid inlet and a fluid outlet, the fluid inlet being constructed and arranged to receive a source of urea solution and the fluid outlet being constructed and arranged to communicate directly with the exhaust flow path so as to control injection of urea solution into the exhaust gas flow path,
   supply structure separate from and external of the fluid injector and in fluid communication with the fluid inlet, the supply structure including a supply tube and a flange sealed to a body of the fuel injector, the supply tube being in fluid communication with the flange and extending from the flange, the supply tube being constructed and arranged to be coupled with the source of urea solution to deliver urea solution to the fluid inlet, and
   a heat shield substantially surrounding the injector, the flange being constructed and arranged to be removably coupled to the heat shield, wherein the supply tube is constructed and arranged to be heated by a heat source so that an entire volume of the urea solution delivered to the fluid inlet is heated.

2. The unit of claim 1, wherein the flange includes a cup coupled to a body of the injector with the supply tube being integral with the cup to define a single member.

3. The unit of claim 1, wherein the flange includes a plurality of flexible tangs extending there-from, an end of the heat shield including a plurality of openings, a tang being received in an associated opening, with the tangs engaging a surface of the heat shield to removably secure the supply structure to the heat shield.

4. The unit of claim 1, wherein the supply structure is molded from plastic.

5. The unit of claim 3, wherein the heat shield is generally cylindrical having an open end with the flange closing the open end, and wherein the heat shield includes openings constructed and arranged to access the tangs.

6. The unit of claim 1, wherein heat shield has opposing first and second ends, a portion of the flange being removably coupled to the first end, the unit further comprising a second flange coupled to the second end of the heat shield, the second flange being constructed and arranged to be coupled to the exhaust gas flow path.

7. The unit of claim 1, in combination with a heater heating the entire supply tube.

8. A reductant delivery unit for selective catalytic reduction (SCR) after-treatment for vehicles, the reductant delivery unit comprising:
   a solenoid fluid injector constructed and arranged to be associated with an exhaust gas flow path upstream of a SCR catalytic converter, the fluid injector having a fluid inlet and a fluid outlet, the fluid inlet being constructed and arranged to receive a source of urea solution and the fluid outlet being constructed and arranged to communicate directly with the exhaust flow path so as to control injection of urea solution into the exhaust gas flow path,
   means for supplying the urea solution, the means for supplying being separate from and external of the fluid injector and in fluid communication with the fluid inlet and including a supply tube and a flange sealed to a body of the fuel injector, the supply tube being in fluid communication with the flange and extending from the flange, the supply tube being constructed and arranged to be coupled with the source of urea solution to deliver urea solution to the fluid inlet, and
   means for shielding the injector, the means for shielding substantially surrounding the injector, the flange being constructed and arranged to be removably coupled to the means for shielding,
   wherein the supply tube is constructed and arranged to be heated by a heat source so that an entire volume of the urea solution delivered to the fluid inlet of the injector is heated.

9. The unit of claim 8, wherein the flange includes a cup coupled to a body of the injector with the supply tube being integral with the cup to define a single member.

10. The unit of claim 8, wherein the flange includes means for removably securing the flange to an end of the means for shielding.

11. The unit of claim 8, wherein the means for supplying is molded from plastic.

12. The unit of claim 9, wherein the means for supplying is molded from plastic.

13. The unit of claim 8, wherein the means for shielding is a generally cylindrical member having an open end, with the flange closing the open end.

14. The unit of claim 8, wherein means for shielding has opposing first and second ends, the flange being removably coupled to the first end, the unit further comprising and a second flange coupled to the second ether end of the heat shield, the second flange being constructed and arranged to be coupled to the exhaust gas flow path.

15. The unit of claim 8, in combination with a heater heating the supply tube.

16. A method of ensuring that urea solution provided to a reductant delivery unit (RDU) for selective catalytic reduction (SCR) after-treatment for vehicles is heated, the RDU including an injector and being mounted with respect to an exhaust gas flow path so as to inject urea solution directly into the exhaust gas flow path, the method comprising:
   providing supply structure separate from and external of the fluid injector and in fluid communication with a fluid inlet of the RDU, the supply structure including a supply tube and a flange sealed to a body of the injector, the supply tube being in fluid communication with the flange and extending from the flange, the supply tube being coupled with the source of urea solution to deliver urea solution to the fluid inlet,
   providing a heat shield to substantially surround the injector,
   coupling, in a removable manner, the flange to the heat shield, and
   heating the supply tube so that an entire volume of the urea solution delivered to the fluid inlet of the RDU is heated.

17. The method of claim 16, wherein the step of providing the supply structure includes molding the supply structure from plastic.

\* \* \* \* \*